United States Patent [19]
Liu et al.

[11] Patent Number: 5,611,931
[45] Date of Patent: Mar. 18, 1997

[54] HIGH TEMPERATURE FLUID SEPARATIONS USING CERAMIC MEMBRANE DEVICE

[75] Inventors: Paul K. T. Liu; Hillary K. Sabol, both of Pittsburgh; Gerald W. Smith, Harwick; Richard J. Ciora, Jr., Butler, all of Pa.

[73] Assignee: Media and Process Technology Inc., Pittsburgh, Pa.

[21] Appl. No.: 509,199

[22] Filed: Jul. 31, 1995

[51] Int. Cl.$^6$ .................................................. B01D 61/00
[52] U.S. Cl. ........................ 210/653; 210/651; 210/323.2; 210/500.25; 95/43; 95/45; 96/10
[58] Field of Search ......................... 210/323.2, 321.78, 210/321.79, 321.8, 321.87, 321.88, 321.89, 510.1, 500.25, 500.26, 650, 651, 653; 95/43, 45; 96/10; 228/121

[56] References Cited

U.S. PATENT DOCUMENTS

| | | |
|---|---|---|
| 3,503,516 | 3/1970 | Harms et al. .......................... 210/323.2 |
| 3,664,507 | 5/1972 | Jordan ...................................... 210/448 |
| 4,177,036 | 12/1979 | Sauder . |
| 4,455,227 | 6/1984 | Harms, II et al. ................... 210/323.2 |
| 4,461,707 | 7/1984 | Thayer et al. ........................ 210/323.2 |
| 4,713,174 | 12/1987 | Zievers et al. ........................ 210/323.2 |
| 4,781,831 | 11/1988 | Goldsmith ............................... 210/247 |
| 4,846,973 | 7/1989 | Barnard ................................. 210/323.2 |
| 5,139,191 | 8/1992 | Velterop . |
| 5,145,580 | 9/1992 | Durrieu ................................. 210/323.2 |
| 5,209,844 | 5/1993 | Zievers et al. ........................ 210/323.2 |
| 5,376,167 | 12/1994 | Broutin et al. ............................. 96/10 |

OTHER PUBLICATIONS

Wu, J.C.S., et al, "High Temperature Separation of binary Gas Mixtures Using Microporous Ceramic Membranes", *J. Membrane Science*, 77, 85 (1993), pp. 85–98.

G. Saracco & V. Specchia, "Catalytic Inorganic Membrane Reactors, Present Experience and Future Opportunities", *Cataly. Review—Sci. Eng.*, 36, 305 (1994), pp. 305–383.

F. M. Velterop et al, "Development of a High Temperature Resistant Module for Ceramic Membranes", *Key Engineering Materials*, 61 & 62, 391 (1991), pp. 391–393.

*Primary Examiner*—Ana Fortuna
*Attorney, Agent, or Firm*—Andrew Alexander

[57] ABSTRACT

A high temperature ceramic membrane device for separation of fluids at high temperature, the device comprises: (a) a housing having: (i) an entrance for introducing fluids to the housing to be separated, (ii) an exit for removing fluids after being subjected to separation; (b) a plate mounted in one end of the housing, the plate having openings therein; (c) ceramic membrane comprised of porous ceramic tubes having a closed end and an open end, the tubes permeable by a fraction of the fluid to be removed from the fluid as filtrate and impermeable to a second fraction, the open end designed to remove the filtrate from the tube, the tubes mounted in the openings in the plate so that the closed end is projected into the housing and the open end is extended outside the housing for removing the filtrate; (d) a seal for sealing the plate in the housing; (e) insulation provided in the housing, the insulation means located adjacent the plate and surrounding the tubes projecting therethrough, the insulation adapted to insulate the hot fluid in the housing from the plate; and (f) cooling outside the housing adjacent the seal to maintain the seal at a relatively low temperature.

19 Claims, 1 Drawing Sheet

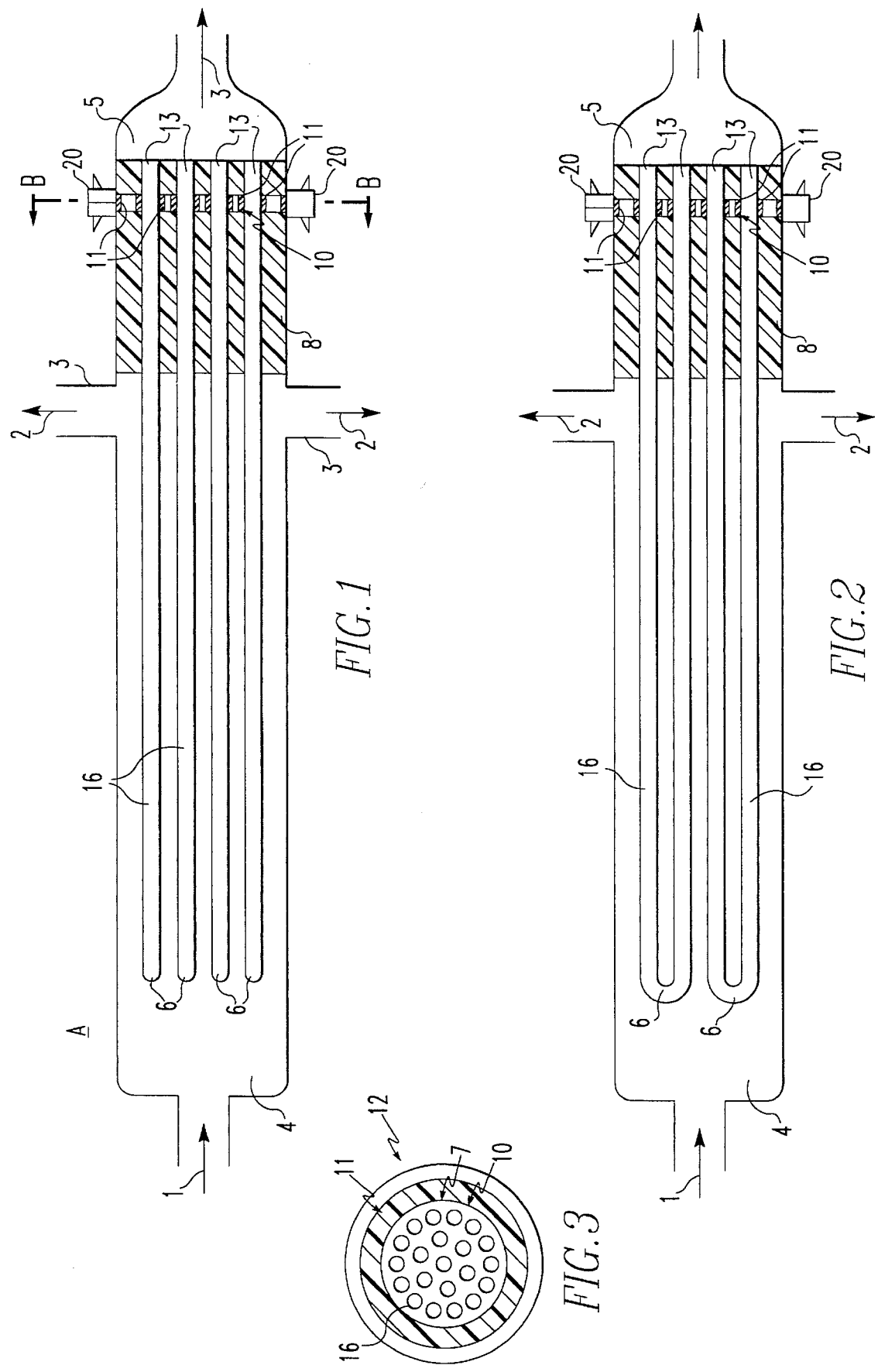

HIGH TEMPERATURE FLUID SEPARATIONS USING CERAMIC MEMBRANE DEVICE

BACKGROUND OF THE INVENTION

The present invention relates to high temperature separation of fluids using a ceramic membrane device and a method for separating fluids at high temperatures using a ceramic membrane device.

Ceramic membranes have been widely used in liquid phase separations in pharmaceutical, food, beverage and other industries. Recently, they have also been tested for gas separations (Wu, J. C. S., et al, "High Temperature Separation of Binary Gas Mixtures Using Microporous Ceramic Membranes", *J. Membrane Science,* 77, 85 (1993)) and catalytic reactions (G. Saracco & V. Specchia, "Catalytic Inorganic Membrane Reactors, Present Experience and Future Opportunities", *Cataly. Review - Sci. Eng.,* 36, 305 (1994)). Ceramic membranes have the advantage of improved thermal and chemical stability over polymeric membranes commonly used in industrial separations.

The use of ceramic membrane tubes in the prior applications is set forth, for example, in F. M. Velterop et al, "Development of a High Temperature Resistant Module for Ceramic Membranes", *Key Engineering Materials,* 61 & 62, 391 (1991), wherein there is disclosed processes such as solid/liquid separation, gas separation and membrane reactor applications. It is noted that ceramic membranes do not find use at high temperatures because of the difficulty in sealing and securing the ceramic membranes in high temperature modules made of different materials, for instance, metals. For purposes of sealing, Veltrop suggests a metallic bellows between the ceramic membrane and the housing. This permits a multiple layer brazing technique for joining (see G. Saracco et al, "Catalytic Inorganic Membrane Reactors, Present Experience and Future Opportunities", *Cataly, Review - Sci. Eng.,* 36, 305 (1994). However, this approach is very costly and complicated.

Velterop U.S. Pat. No. 5,139,191 discloses a method of connecting a ceramic material to another material. According to the method, porous material is used that, prior to making a connection is gradually compacted from the contact surface with the greatest density at the contact surface, wherein on the contact surface of the porous material a mixture of titanium hydride ($TiH_2$) and quartz flour ($SiO_2$) is applied. Then the so treated porous ceramic material is heated to 1200°–1800° C. during 1–40 hours. Finally the so compacted porous ceramic material, in a manner known per se, is connected to the other material.

Goldsmith U.S. Pat. No. 4,781,831 discloses a cross-flow filtration device which separates a feed stock into filtrate and retentate, including a structure of porous material which defines a plurality of passageways extending longitudinally from the feed end of the structure to a retentate end, and a number of filtrate conduits within the structure for carrying filtrate from within the structure toward a filtrate collection zone.

Jordan U.S. Pat. No. 3,664,507 discloses filter robes in a resilient holder wherein a filter unit is used for the fine filtration of various fluids with the filter element comprising a plurality of elongated, hollow rods made of a rigid porous material that are individually held in position by a resilient holder.

Sauder U.S. Pat. No. 4,177,036 discloses a high temperature industrial furnace comprising a clean interior face of a metal furnace casing, a corrosion inhibitor/adhesive, and a ceramic fiber insulation module attached to the casing with the adhesive to provide an elastic or flexible bond between the casing and the insulating material. The corrosion inhibitor/adhesive may be applied over a relatively large surface area of the casing to provide a vapor impervious membrane. A silicone compound is a preferred corrosion inhibitor/adhesive material.

However, it will be seen from the above that there is still a great need for a ceramic membrane device that may be employed economically for high temperature separation of gases or liquids, for example.

SUMMARY OF THE INVENTION

It is an object of this invention to provide an improved ceramic membrane module for separating fluids at high temperatures.

It is another object of this invention to provide a process for high temperature separation fluids utilizing a ceramic membrane module.

Yet, it is another object of the present invention to provide an improved ceramic membrane module comprised of porous ceramic tubes disposed in a housing.

And yet, it is another object of the invention to provide an improved ceramic membrane tube device for use at high temperatures wherein said tubes have improved seals.

In accordance with these objects, there is provided a high temperature ceramic membrane device for separation of fluids at high temperature, the device comprises: (a) a housing having: (i) an entrance for introducing fluids to the housing to be separated, (ii) an exit for removing fluids after being subjected to separation; (b) a plate mounted in one end of the housing, the plate having openings therein; (c) ceramic membrane comprised of porous ceramic tubes having a closed end and an open end or having a U-shaped or other configuration which permits sealing in a housing, the tubes permeable by a fraction of the fluid to be removed from the fluid as filtrate or permeate and impermeable to a second fraction, the open end designed to remove the filtrate or permeate from the tube, the tubes mounted in the openings in the plate so that the closed end or the U-bend is projected into the housing and the open end or ends are extended outside the housing for removing the filtrate; (d) a seal for sealing the plate in the housing; (e) insulation means provided in the housing, the insulation means located adjacent the plate and surrounding the tubes projecting therethrough, the insulation means adapted to insulate the hot fluid in the housing from the plate; and (f) cooling means outside the housing adjacent the seal to maintain the seal at a relatively low temperature.

Also disclosed is a method of heating a fluid maintained at a temperature of greater than 100° C., preferably greater than 200° C., to remove a fraction of the fluid as filtrate thereby leaving a retentate, the method comprising the steps of: (a) providing a membrane device for treating the fluid, the device comprising (i) a housing having an entrance for introducing fluid to the housing to be treated, an exit for removing retentate after the fluid is treated; (ii) a plate mounted in one end of the housing, the plate having openings therein; (iii) membrane means comprising porous ceramic tubes preferably having a closed end and an open end or having a U-shape, the tubes permeable by the fraction of the fluid to be removed from the fluid as filtrate and impermeable to the retentate, the open end designed to remove the filtrate from the tube, the tubes mounted in the openings in the plate so that the closed end or U-shape is projected into the housing and the open end or ends are extended outside the plate; (iv) insulation means provided in the housing, the insulation means located adjacent the plate and surrounding the tubes projecting therethrough, the insulation means effective in insulating hot fluid in the housing from contacting the plate; (b) introducing the fluid to the housing; (c) maintaining the fluid at a temperature greater than 100° C., preferably greater than 200° C., and at a pressure sufficiently high to maintain a high pressure side outside the tubes and a low pressure side inside the tubes; (d) passing a fraction of the fluid through the porous tube to provide a filtrate inside the tubes and to provide retentate outside the tubes; (e) removing retentate from the housing; and (f) removing filtrate through the open end of the tubes.

Further provided is a method of heating hydrocarbons at a temperature of greater than 100° C., preferably greater than 200° C., to remove low molecular weight hydrocarbons or hydrogen from high molecular weight hydrocarbons, the method comprising the steps of: (a) providing a membrane device for removing the low molecular weight hydrocarbons or hydrogen from the high molecular weight hydrocarbons, the device comprising (i) a housing having an entrance for introducing hydrocarbons containing the low molecular weight hydrocarbons or hydrogen to the housing to be treated, an exit for removing hydrocarbons after being subjected to low molecular weight hydrocarbons or hydrogen removal treatment; (ii) a plate mounted in one end of the housing, the plate having openings therein; (iii) a membrane means comprised of porous ceramic tubes having a closed end and an open end or having a generally U-shaped configuration, the tubes permeable by the low molecular weight hydrocarbons or hydrogen and impermeable by the high molecular weight hydrocarbons, the open end designed to remove the low molecular weight hydrocarbons or hydrogen from the tube, the tubes mounted in the openings in the plate so that the closed end or U-shape is projected into the housing and the open end or ends are extended outside the plate; (iv) insulation means provided in the housing, the insulation means located adjacent the plate and surrounding the tubes projecting therethrough, the insulation means effective in insulating hot hydrocarbons in the housing from the plate; (b) introducing the hydrocarbons containing the low molecular weight hydrocarbons or hydrogen to the housing; (c) maintaining the hydrocarbons at a temperature greater than 100° C., preferably greater than 200° C., and at a pressure sufficiently high to maintain a high pressure side outside the tubes and a low pressure side inside the tubes; (d) passing low molecular weight hydrocarbons or hydrogen through the porous tube to separate the low molecular weight hydrocarbons or hydrogen from the high molecular weight hydrocarbons; (e) removing high molecular weight hydrocarbons from the housing; and (f) removing low molecular weight hydrocarbons or hydrogen through the open end of the tubes.

BRIEF DESCRIPTION OF THE DRAWINGS

FIG. 1 is a cross-sectional view of ceramic membrane module for high temperature fluid/fluid separations.

FIG. 2 shows U-tube ceramic membranes and module configuration for high temperature fluid/fluid separations.

FIG. 3 is a cross-sectional view of the tube sheet along the line B—B of FIG. 1.

DETAILED DESCRIPTION OF THE PREFERRED EMBODIMENTS

Referring now to FIG. 1, there is shown a cross-sectional view of a ceramic membrane module or device A having a shell 12 and ceramic membrane tubes 16 in accordance with the invention. In the module, hot influent or hot feed 1 is introduced to the module and permeate is removed through porous ceramic membrane tubes 16 and removed through open end 13 of tubes 16. Retentate 2 is removed at exits 3. Tubes 16 are mounted in a sheet or plate 10 and an insulation body or zone 8 is provided inside the module to prevent hot influent or feed entering the module coming in contact with the sheet or plate 10.

Ceramic membrane tubes can consist of a multi-layered asymmetric structure comprising a base support and several thin layers deposited thereon. The support is generally a thick, very porous structure which provides mechanical strength to the membrane element without significant flow resistance. The support can comprise $\alpha\text{-}Al_2O_3$ having a thickness of about 0.1 to 30 mm, depending upon configuration (i.e., tubular, multiple channel or honeycomb) and a nominal pore size of 10 to 15 microns. Additional layers with progressively smaller pore sizes may be deposited on this support, e.g., 0.01 to 0.02 mm of $\alpha\text{-}Al_2O_3$ layer with 0.8 micron pore size and 0.01 to 0.02 mm of $\alpha\text{-}Al_2O_3$ layer with 0.2 micron pore size. The composite asymmetrical membrane element utilizing the 0.2 micron pore size layer is sometimes used as a microfilter. The microfilter can be used as a support for an ultrafiltration layer. A separation layer can be deposited with a pore size <0.2 micron via slip casting of sols prepared from alkoxides of aluminum or zirconium. Depending upon the firing temperature (ranging from 400° to 1400° C.), a membrane with a pore size between 40Å and less than about 0.2 micron can be obtained. Membranes with a pore size of 40Å can perform gas separations according to Knudsen diffusion. Membranes with a pore size of less than 40Å are capable of performing molecular sieving, as reported recently in *J. Membrane Science,* 1994, Vol. 96, p. 275, Wu, J.S.C., et al, "Characterization of Hydrogen-Selective Membranes."

A ceramic membrane tube suitable for use in the invention is available from U.S. Filter (Wanendale, Pa.) in the range of 7 mm ID with a length of 25 cm and greater or from Coors Ceramic (Golden, Co.) in the range of 1.27 mm ID with a length of 25 cm and greater. These tubes can be packed in a configuration similar to a shell-and-tube heat exchanger or in a bundle arrangement. An alternative to the array of single tubes is a monolith containing multiple tubes as above with a diameter of 4–6 min.

This invention includes the use of ceramic membrane tubes having one end closed and the other end open or having a U-shaped configuration with both ends open. The open end 13 of the tube is mounted inside the shell through the tube sheet (see FIGS. 1 and 2). In addition, as noted, an insulation zone 8 is installed near tube sheet 10 to keep the tube sheet from direct exposure to the hot influent or feed gas. Thus, this device can then be used at a high temperature without introducing thermal expansion stress between the tube and the housing and the problem attendant therewith. Insulation means as used herein is meant to include insulation surrounding the tubes as well as a heat shield positioned away from sheet or plate 10 to prevent hot influent from coming in contact with the plate.

The ceramic membrane can be in the configuration of a bundle of single tubes, or a monolith containing multiple channels, or a bundle of monolithic tubes. FIG. 1 shows the details of one of the preferred embodiments. An open end of the ceramic membrane tubes 13 is mounted to a tube sheet 10 while the closed end 6 is suspended in shell 12. Any stress resulting from the difference in thermal expansion between the shell and the tube is eliminated. The feed 1 can be delivered into first chamber 4 sub-divided by the tube sheet 10 within the housing, while the permeate can be withdrawn from open end 13 located in the second chamber 5 sub-divided by the tube sheet. In a high temperature environment, the ceramic tube expands differently than the shell 12 because of the difference in coefficient of expansion. The ceramic material normally has a thermal coefficient less than that of the low expansion alloy from which shell 12 is made (Harkins, B. D. and Ward, M. E., "Preliminary Design of a High-Pressure, High-Temperature Ceramic Air Heat Exchanger", ed. by Davis, L. R., Sohal, M. S. and Sengupta, S., ASMI Heat Transfer Div. Publ. Vol. HTD-118). In the present invention, at a high temperature, the shell can expand differently from the ceramic tube. Because the tube is mounted only on the one side, the difference in expansion coefficients does not create stresses that have the potential to crack the ceramic tube.

The flow pattern in the shell side can be countercurrent, co-current or radial current with respect to the permeate flow in the tube side.

With respect to tubes 16 (FIG. 1), end 6 can be closed by plugging with glass having a similar expansion co-efficient or with the same material used for making the tube or the end can be closed during forming. Instead of a closed end, a U-tube can be used as shown in FIG. 2. Both openings of the U-tube are mounted to the shell through a tube sheet or plate 20. Thus, the U-bend projected into the shell as shown in FIG. 2. This configuration has the advantage that it allows the tube to be used for a purge gas, if necessary). The purge gas is fed from one end of the tube anal carries the permeate out of the module through the other end of the tube. Alternatively, the feed can be delivered into the one end of the tube side and then discharged from the other end of the same tube. Under this flow configuration, permeate can be removed from the shell side of the tubes.

In addition to eliminating the difficulties in the thermal expansion coefficient difference, the above module design offers flexibility in the selection of seal material between the tube sheet and the housing without the use of complicated joining designs. Also, a tube sheet or plate 10 containing multiple channel tubes can be used without the requirement to seal individual robes to the housing. The distance between tubes can be increased or reduced depending upon the application, or the tubes can be provided contacting each other to form a bundle.

A preferred configuration of the tube sheet is shown in FIG. 3. The circumference of this tube sheet can be maintained at a lower temperature because of the insulation means or external cooling without generating material-or-process-related difficulties. Thus, organic or inorganic seals can be used to maintain a gas-tight seal without creating stress in the tube sheet.

In order to prevent escape of hot influent, tube sheet or plate 10 is provided with a seal 11 between plate 10 and inside shell 12. Seal 11 is effective in sealing influent 1 in shell 12 and permits shell 12 to expand and contract at a different rate than plate 10 without forming openings or the like that permit escape of hot influent. In the present invention, the seal may be formed from an organic polymeric material, such as Kalrez, available from DuPont, can be used which is stable up to 270° C. to maintain a gas-tight environment; or, ceramic fiber mixed with adhesive can be used.

Further, it has been discovered that the use of insulation body 8 placed or located inside shell 12 adjacent plate 10 and surrounding tubes 6 is effective in preventing hot influent 1 coming in contact with seals 11. Thus, seals do not come in contact with the hot operating temperatures, e.g., greater than 100° C., typically 200° C. Accordingly, seal life is greatly extended and the module can be operated with freedom from leakage. Insulation body 8 may be comprised of ceramic fibers, such as glass fibers and alumina fibers, and other heat shield means that provide resistance to heat flow may be used. Also, porous clay or cement may be used as insulation.

To further improve the life of the seals, cooling means 20 may be used on the outside of shell 12 opposite seals 11. Cooling means 20 is effective in maintaining seals 11 at a lower operating temperature and, in conjunction with insulation body 8, will maintain the temperature of the seals well below the temperature of hot influent 1. Cooling means 20 may be in the form of fins extending radially from shell 12, or in the form of cold or chilled fluid piped around the outside of shell 12.

Accordingly, in the present invention no direct convective flow of hot influent in the shell-side will contact the seal surrounding the robe sheet. However; a temperature profile can develop within the insulation zone for temperature transition. Because the insulation material 8 does not adhere to the membrane tube, the expansion coefficient difference between the tube and the insulation material does not create any stress. Further, as noted, cooling can be used to specifically cool the seal externally if necessary, to maintain the seal below its maximum allowable temperature. To further protect the seal from heat, insulation can be applied at the open end 13 of the tube side 9 of the module to protect the seal from the direct convective heat transfer from the permeate.

The tube sheet (as shown in FIG. 3 ) which mounts the tube to the housing can be designed to avoid thermal stress created by the cooling around the seal. The tube sheet can be selected from the material with an expansion coefficient similar to the ceramic robes. Thus, a minimal stress as a result of thermal expansion difference is introduced as a result of the cooling around the seal. The tube sheet preferably is made of the same material as the ceramic tube. Further, the tube should be mounted in the tube sheet to achieve a gas-tight fit. This can be done by sealing the ceramic tube in the tube sheet, or filling the clearance with a sealing compound which has a matched thermal expansion coefficient of the tube, e.g., glass.

Under the configuration of a bundle of single tubes, the tubes can be combined together with above seal materials (e.g., glass) to serve as a tube sheet. Thus, no plate is required under this configuration.

The following examples are further illustrative of the present invention.

EXAMPLE 1

A ceramic membrane module was fabricated for high temperature gas permeation test. A 0.2 µM ceramic membrane tube (with 7 mm ID and 30.4 cm L) was used in this test. The tube was first closed in one end using a solution containing α-$Al_2O_3$ powder (A-10, Alcoa) mixed with a glass binder. The one end of the tube after dipping with the solution was dried and then fired at 1100° C. for 12 hours. After cooling, the tube end was checked for leaks by introducing high pressure air into the tube which was immersed in the water. No bubbles were observed, confirming the end was tightly closed. Then, a tube sheet made up from the same material α-$Al_2O_3$ was prepared by cutting a thin section from a ceramic tube. The tube was sealed to the tube sheet with a glass binder at 2.5 cm from the open end of the tube. Also, the clearance between the tube sheet and the tube was sealed with glass binder. Again, the tube was fired according to the previous firing condition. This tube and tube sheet was then mounted in a 2.5 cm ID of stainless steel shell with a high temperature epoxy (Tracon #2212 from Medford, Mass.). Ceramic fire brick (available from McMaster Carr, Brunswick, N.J., ground to 50 to 100 mesh U.S. Sieve series) was then used to fill the both sides of the tube sheet to provide an insulation zone. The ground ceramic fire brick was held in place using a cement available from Sauerasen, Pittsburgh, Pa., under the designation 360 Sauerasen cement. About 10.2 cm of the fiber was packed in the feed side of the tube sheet; and 2.5 cm in the discharge side. The module was placed in a high temperature furnace set at ~600° C. for gas permeation study. The feed rate of nitrogen was initially set at 500 cc/min and eventually increased to 571 cc/min. The permeation rate was controlled at 44 cc/min initially and eventually increased to 571 cc/min. The temperature readings in each case were recorded and are shown in Table 1. In cases I and II, without external air cooling, the temperature at the outer skin near the seal was about 204°–224° C., which is below the maximum allowable temperature for the seal material (270° C.) used. With external cooling at the seal, the temperature dropped to 71° C. After the test, the module was visually examined and the tube sheet and the seal were not damaged. Also, the ceramic tube was not damaged. The temperature measurement obtained here supports that the ceramic membrane tube was subject to the high temperature (570° C.) testing because the retentate temperature was close to the feed temperature. This confirms that the mounting of the ceramic membrane tube, its configuration, the use of seals, and the insulation zone are acceptable for high temperature applications.

TABLE 1

Temperature Profile of Ceramic Membrane Module for High Temperature Gas Permeation Test

| | Temperature Location | | | | |
|---|---|---|---|---|---|
| Permeation Rate (cc/min) | 1/3 Along Tube (°C.) | Near Closed End of Tube (°C.) | 2/3 Along Tube (°C.) | Middle of Insulation (°C.) | Near Seal (°C.) |
| 44 | 576 | 564 | 550 | 354 | 202 |
| 571 | 569 | 555 | 545 | 372 | 224 |
| 571* | 566 | 545 | 524 | 305 | 71 |

*external cooling to the end of module

EXAMPLE 2

An array (7) of ceramic tubes mounted on a ceramic tube sheet was used in this example. These tubes were formed from $\alpha$-$Al_2O_3$ and had a 1/8" ID and 2.75" active length. Their average pore diameter according to mercury porosimetry is 0.27 micron. One end of the tube was sealed according to the procedure described in Example 1. The tube sheet construction follows the same procedure as described in Example 1. This tube sheet was then mounted to a stainless housing used in Example 1. During a one hour test at a temperature of 480° C., various readings were taken and are presented in Table 2. After the test, the module was cooled down and no cracks or damage to the module was found. Thus, it will be seen that the module construction is suitable for fluid separation at a high temperature environment using ceramic membrane.

TABLE 2

Temperature Profile of Ceramic Membrane Module for High Temperature Gas Permeation Test

| | | | Temperature Location | | |
|---|---|---|---|---|---|
| Feed Rate (cc/min) | Permeation Rate (c/min) | Reject Rate (cc/min) | Adjacent Insulation Inside Shell (°C.) | Permeate Side (°C.) | At Seal Between Sheet Tube and Shell (°C.) |
| 525 | 422 | 58 | 478–483 | 94–105 | 43–39 |

While the invention has been described in terms of preferred embodiments, the claims appended hereto are intended to encompass other embodiments which fall within the spirit of the invention.

What is claimed is:

1. A high temperature ceramic membrane device for separation of fluids at high temperature, the device comprising:
   (a) a housing having:
      (i) an entrance for introducing fluids to said housing to be filtered,
      (ii) an exit for removing fluids after being subjected to filtration;
   (b) a plate mounted in one end of said housing, said plate having openings therein;
   (c) a ceramic membrane comprised of at least one porous ceramic tube having a portion projecting through said plate into said housing through said opening, said tube having an open end extending outside said housing, said tubes permeable by a fraction of said fluid to be removed from said fluid as permeate, the open end designed to remove said permeate from said tube;
   (d) a seal for sealing said plate in said housing; and
   (e) insulation means provided in said housing, said insulation means surrounding said robes in said housing and positioned to insulate said hot fluid in said housing from said plate.

2. The device in accordance with claim 1 wherein said porous ceramic tube is selected from a tube having a U-shaped configuration and a tube having a sealed end extending through said plate into said housing.

3. The device in accordance with claim 1 wherein said seal is formed of a polymeric material.

4. The device in accordance with claim 1 including means for cooling outside of said housing adjacent said seal to maintain said seal at a temperature lower than said fluid.

5. The device in accordance with claim 1 wherein said plate is formed by a bundle of ceramic tubes which are sealed together.

6. The device in accordance with claim 1 wherein said porous ceramic tubes are comprised of at least a material selected from the group consisting of alumina, zirconia, silica and titania and mixtures thereof.

7. The device in accordance with claim 1 wherein said ceramic tubes have a pore size of 500Å or less.

8. The device in accordance with claim 1 wherein insulation comprising said insulation means is selected from the group consisting of ceramic fibers, porous clay, cement and glass fibers.

9. A method of treating a fluid maintained at a temperature of greater than 100° C. to remove a fraction of the fluid as permeate thereby leaving a retentate, the method comprising the steps of:
   (a) providing a membrane device for treating said fluid, the device comprising
      (i) a housing having an entrance for introducing fluid to said housing to be treated, an exit for removing retentate after said fluid is treated;
      (ii) a plate mounted in one end of said housing, said plate having openings therein;
      (iii) membrane means comprising porous ceramic tubes, said tubes permeable by said fraction of said fluid to be removed from said fluid as permeate and impermeable to said retentate, said tubes having an open end designed to remove said permeate from said tube, said tubes mounted in said openings in said plate so that said open end is extended outside said plate; and
      (iv) insulation means provided in said housing, said insulation means surrounding said tubes in said housing and positioned to insulate said fluid in said housing from said plate;
   (b) introducing said fluid to said housing;
   (c) maintaining said fluid at a temperature greater than 100° C. and at a pressure sufficiently high to maintain a high pressure side outside said tubes and a low pressure side inside said tubes;
   (d) passing a fraction of said fluid through said porous tube to provide permeate inside said tubes and to provide retentate outside said tubes;
   (e) removing retentate from said housing; and
   (f) removing permeate through the open end of said tubes.

10. The method in accordance with claim 9 including the step of providing a seal between said plate and said housing effective in sealing said plate in said housing.

11. The method in accordance with claim 10 wherein said seal is formed of a polymeric material.

12. The method in accordance with claim 11 wherein said ceramic tubes have a pore size of <500Å.

13. The method in accordance with claim 10 including the step of cooling outside of said housing adjacent said seal to maintain said seal at a temperature lower than said fluid.

14. The method in accordance with claim 9 wherein said porous ceramic robes me comprised of at least a material selected from the group consisting of alumina, zirconia, silica and titania and mixtures thereof.

15. The method in accordance with claim 9 wherein insulation comprising said insulation means is selected from the group consisting of ceramic fibers, porous clay, cement and glass fibers.

16. The method in accordance with claim 9 including the step of treating a fluid comprised of hydrocarbons to separate low molecular weight hydrocarbons from high molecular weight hydrocarbons or to separate hydrogen from hydrocarbons.

17. The method in accordance with claim 16 wherein said hydrocarbons are gaseous hydrocarbons.

18. A method of treating hydrocarbons at a temperature of greater than 100° C. to remove low molecular weight hydrocarbons or hydrogen from high molecular weight hydrocarbons, the method comprising the steps of:
   (a) providing a membrane device for removing said low molecular weight hydrocarbons or hydrogen from said high molecular weight hydrocarbons, the device comprising
      (i) a housing having an entrance for introducing hydrocarbons containing said low molecular weight hydrocarbons or hydrogen to said housing to be treated, an exit for removing hydrocarbons after being subjected to a low molecular weight hydrocarbons or hydrogen removal treatment;
      (ii) a plate mounted in one end of said housing, said plate having openings therein;
      (iii) a membrane means comprised of porous ceramic tubes, said tubes permeable by said low molecular weight hydrocarbons or hydrogen and substantially impermeable by said high molecular weight hydrocarbons, the open end designed to remove said low molecular weight hydrocarbons or hydrogen from said tube, said tubes mounted in said openings in said plate so that said open end is extended outside said plate; and
      (iv) insulation means provided in said housing, said insulation means surrounding said tubes in said housing and positioned to insulate hot hydrocarbons in said housing from said plate;
   (b) introducing said hydrocarbons containing said low molecular weight hydrocarbons or hydrogen to said housing;
   (c) maintaining said hydrocarbons at a temperature greater than 100° C. and at a pressure sufficiently high to maintain a high pressure side outside said tubes and a low pressure side inside said tubes;
   (d) passing low molecular weight hydrocarbons or hydrogen through said porous tube to separate said low molecular weight hydrocarbons or hydrogen from said high molecular weight hydrocarbons;
   (e) removing high molecular weight hydrocarbons from said housing; and
   (f) removing low molecular weight hydrocarbons or hydrogen through the open end of said tubes.

19. A high temperature ceramic membrane device for separation of fluids at high temperature, the device comprising:
   (a) a housing having exit for removing permeate after being subjected to filtration;
   (b) a plate mounted in one end of said housing, said plate having openings therein;
   (c) a ceramic membrane comprised of at least one porous ceramic tube having a U-shaped portion comprising a U-tube, the U-shaped portion projecting into said housing through said openings in said plate, said U-tube having a first open end and a second open end, both first and second open ends extending through said plate outside said housing, said tube permeable by a fraction of said fluid to be removed from said fluid as permeate and impermeable to a second fraction, the first open end adapted for adding fluid to said tube to be filtered and the second open end adapted for removing fluids from said tube after being filtered;
   (d) a seal for sealing said plate in said housing; and
   (e) insulation means provided surrounding said tube, the insulation means positioned on at least one side of said plate to insulate fluids at high. Temperately from said plate.

* * * * *